United States Patent [19]

Masuda et al.

[11] Patent Number: 4,874,437

[45] Date of Patent: Oct. 17, 1989

[54] METHOD OF ADJUSTING HARDNESS OF METALLIC MATERIAL

[75] Inventors: Yoshihiko Masuda, Yokohama; Masanobu Murakosi, Yokosuka, both of Japan

[73] Assignee: Kioritz Corporation, Tokyo, Japan

[21] Appl. No.: 307,545

[22] Filed: Feb. 8, 1989

[51] Int. Cl.$^4$ .............................................. C21D 2/00
[52] U.S. Cl. ..................................... 148/150; 148/152
[58] Field of Search ................ 148/150, 146, 152, 154

[56] References Cited

U.S. PATENT DOCUMENTS 3,377,214  4/1968  Woodbridge et al. ............. 148/16.6
4,415,378  11/1983  McKinney et al. ................ 148/16.5

FOREIGN PATENT DOCUMENTS 3123114  6/1981  Fed. Rep. of Germany .

Primary Examiner—R. Dean
Attorney, Agent, or Firm—Browdy and Neimark

[57] ABSTRACT

A method of adjusting the hardness of a metallic material includes the steps of induction-tempering both of tough and hard portions which have been given a hardness required for the hard portion to a hardness required for the tough portion, induction-hardening the hard portion alone to a hardness higher than that required for the hard portion, and induction-tempering the hard portion alone to a hardness required for the hard portion.

3 Claims, No Drawings

METHOD OF ADJUSTING HARDNESS OF METALLIC MATERIAL

BACKGROUND OF THE INVENTION

1. Field of the Invention

The present invention relates to a method of adjusting the hardness of a metallic material, and more particularly, to a method of adjusting the hardness of a metallic material such as a shaft member in which a portion that requires toughness (hereinafter referred to as a tough portion) such as a threaded portion and a portion that should be made hard (hereinafter referred to as a hard portion) such as a bearing portion are formed adjacent to each other.

2. Description of the Related Art

There are various types of machine parts made of a metallic material, such as a shaft member material made of steel or alloyed steel in which a tough portion and a hard portion are formed adjacent to each other. Such inter machine parts include a crankshaft for a chain saw. In the crankshaft for the chain saw, a threaded or key way portion requiring toughness is formed adjacent to a bearing portion requiring hardness. Conventionally, the hardness of the metallic material in which tough and hard portions are to be formed adjacent to each other is adjusted in the manner described below: first, the surface of a tough portion is copper plated, and a hard portion is then carburized. At this time, the tough portion is protected from being carburized by the copper plated thereon. Subsequently, the copper plated on the tough portion is removed.

Such a conventional hardness adjusting method requires troublesome and expensive processes such as copper plating and removal of the copper plated, and is uneconomical because it employs consumably materials such as copper. Furthermore, it is difficult to continuously process a metallic material automatically in that method.

SUMMARY OF THE INVENTION

Accordingly, an object of the present invention is to provide a hardness adjusting method which can obviate the aforementioned problems of the prior art, and which requires only simple processes to economically adjust the hardness of a metallic material in which tough and hard portions are to be formed adjacent to each other without deteriorating the properties of the respective portions.

To this end, the present invention provides a method of adjusting the hardness of a metallic material which is required to form tough and hard portions adjacent to each other, which comprises the steps of: induction-tempering both of tough and hard portions which have been given a hardness required for the hard portion to a hardness required for the tough portion; induction-hardening only the hard portion to a hardness higher than that required; and induction-tempering only the hard portion so as to reduce the hardness thereof to a requrired value.

Thus, in the present invention, after both of the tough and hard portions formed adjacent to each other in a metallic material have been induction-tempered, only the hard portion is induction-hardened and is then induction-tempered. In consequence, the hard portion can be tempered to the required hardness without conducting carburizing preventing process such as copper plating on the portion required for toughness. This reduces the number of processes required, and eliminates the use of consumable material such as copper. This in turn allows the metallic material to be quickly processed at a low cost, facilitates automation of the overall process and enables a large quantity of material to be processed continuously.

BRIEF DESCRIPTION OF THE DRAWING

The sole FIGURE is a cross-sectional view of a chain saw incorporating a crankshaft which has been given the required hardness by a method according to the present invention.

DESCRIPTION OF THE PREFERRED EMBODIMENT

An embodiment of the present invention will be described below.

A chain saw shown in the sole FIGURE incorporates in a body 1 an internal combustion engine 2 as a power source. A piston 4 disposed in a cylinder 3 of the internal combustion engine 2 is coupled to a crankshaft 6 through a connecting rod 5. The crankshaft 6 is rotatably supported by bearings 7 and 8. A cooling fan 9 and a recoil type starter 10 are coupled to one end of the crankshaft 6. A threaded portion 11 which is a tough portion is provided on the other end of the crankshaft 6. A driving member 13 of a centrifugal clutch is threadedly engaged with the threaded portion 11. A saw chain driving sprocket 16 is supported through a needle bearing 15 on a bearing portion 14 of the crankshaft 6 which is a hard portion and which is located on the outside of the threaded portion 11 adjacent thereto in the axial direction of the crankshaft 6, in such a manner as to be rotatable relative to the crankshaft 6. A tough portion 17 located on the outside of the bearing portion 14 adjacent thereto in the axial direction is also threaded, and a nut 18 is threadedly engaged with this threaded portion 17, by means of which the sprocket 16 is firmly held on the crankshaft 6 with a washer 19. The sprocket 16 is firmly coupled to a clutch from 20 which serves as a driven member of the centrifugal clutch 12. During the operation, a clutch shoe 21 of the centrifugal clutch 12 moves outwardly in the radial direction by the action of centrifugal force, and makes contact with the inner peripheral surface of the clutch drum 20, by means of which driving force is transmitted to the clutch drum 20 from the crankshaft 6 so as to rotate the sprocket 16 and thereby drive a saw chain (not shown) engaging with the sprocket 16 about a guide bar 22, which may be conducted to cut a tree or the like.

Thus, among the portions 11, 14 and 17 formed on the crankshaft 6 adjacent to each other, the portions 11 and 17 are threaded and are respectively engaged with the driving member 13 and the nut 18 and, hence, require toughness. On the other hand, bearing portion 14 rotatably supports the needle bearing 15 and, hence, requires higher hardness than that required for the threaded portions. The present invention is applied to the adjustment of the hardness of these three portions 11, 14 and 17 of the crankshaft 6.

According to the present invention, a material such as chrome-molybdenum steel, the entirety of which has been carburized and tempered to the hardness of about HRc 60 to 64 which is the hardness required for the bearing portion 14 is, for instance, prepared as a crankshaft 6. In the first process, all the three portions 11, 14 and 17 of the thus-prepared crankshaft 6 is subjected to induction-tempering at a frequency of 100 kHz and a voltage of about 4 to 6 kV for about 4.0 to 6.5 seconds to reduce the hardness to HRc 40 to 60, which is required for the threaded portions 11 and 17.

Next, in the second process, only the bearing portion 14 of the crankshaft 6 is induction-hardened to a hardness of HRc 60 or above. In that case, if the bearing portion 14 has a diameter of about 12 mm, it is heated at 100 kHz and about 12 kVa for one second, and is then immersed in a water containing water-soluble quenching media. Oil hardening which employs oil in place of water to quench the crankshaft 6 may also be performed.

Then in the third process, the crankshaft 6 is subjected to tempering in which it is heat-treated at about 100° C. to 180° C. for about 30 minutes to 2 hours to reduce the hardness to HRc 60 to 64, which is the predetermined hardness required for the bearing portion 14.

Subsequently, threading is performed on the tough portions 11 and 17 of the thus-prepared crankshaft 6.

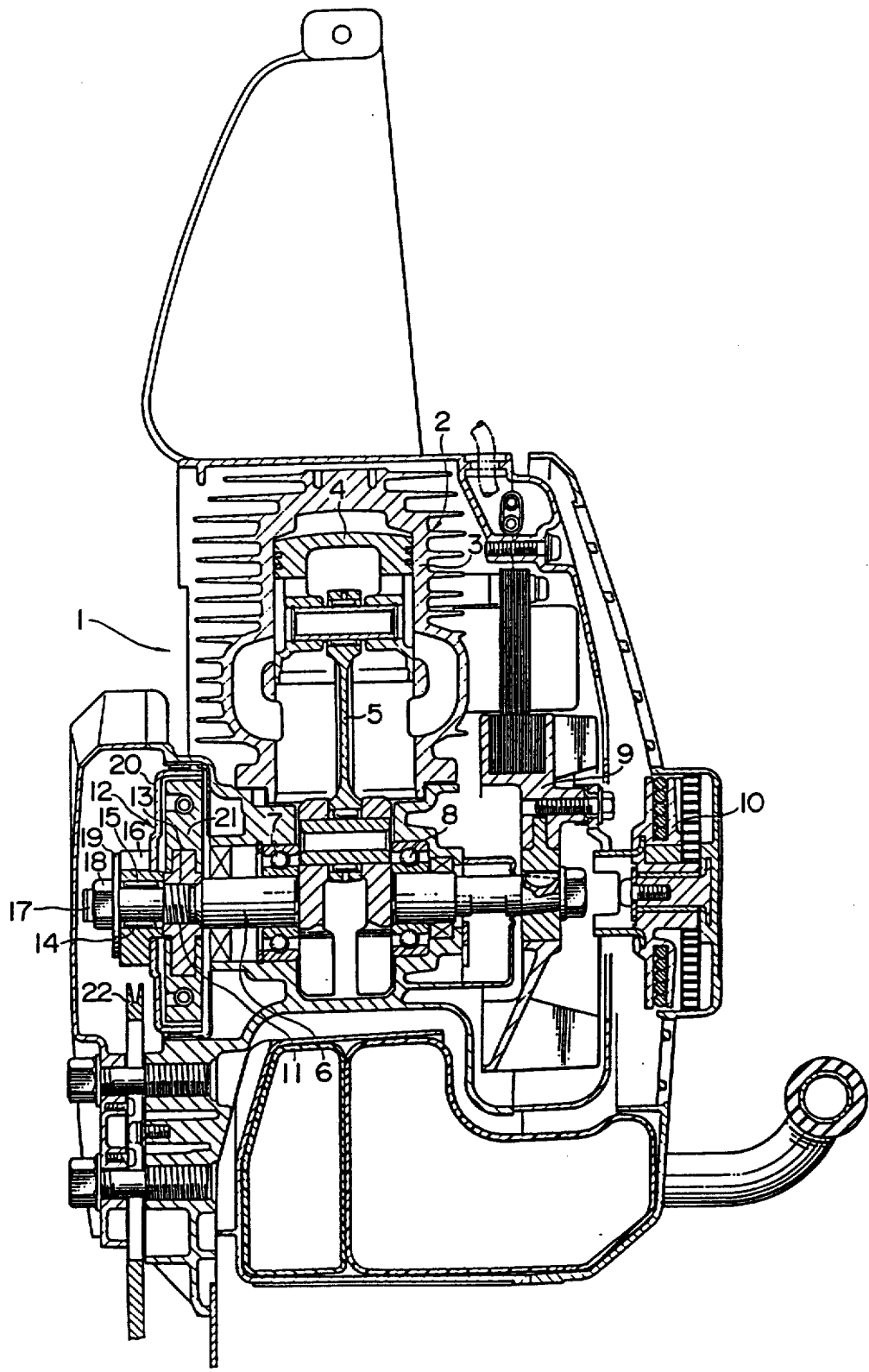

What is claimed is:

1. A method of adjusting the hardness of a metallic material which is required to form tough and hard portions adjacent to each other, comprising the steps of:
    induction-tempering both of said tough and hard portions which have been given a hardness required for said hard portion to a hardness required for said tough portion;
    induction-hardening said hard portion alone to a hardness higher than that required for said hard portion; and
    induction-tempering said hard portion alone to a hardness required for said hard portion.

2. A method of adjusting the hardness of a crankshaft according to claim 1, wherein said tough portion is a portion to be threaded, and said hard portion is a bearing portion.

3. A method of adjusting the hardness of a crankshaft according to claim 2, wherein the entirety of said portion to be threaded and said bearing portion is induction-tempered at 100 kHz and about 4 to 6 kV for about 4.0 to 6.5 seconds to reduce the hardness of said portion to be threaded to about HRc 40 to 60, and said hard portion is tempered at 100° C. to 180° C. for about 30 minutes to 2 hours to reduce the hardness of said bearing portion to HRc 60 to 64.

* * * * *

UNITED STATES PATENT AND TRADEMARK OFFICE
CERTIFICATE OF CORRECTION

PATENT NO. : 4,874,437

DATED : October 17, 1989

INVENTOR(S) : MASUDA ET AL.

It is certified that error appears in the above-identified patent and that said Letters Patent is hereby corrected as shown below:

On the title page, "3 Claims, No Drawings" should read
--3 Claims, 1 Drawing Sheet--.

Please insert the attached drawing figure.

Signed and Sealed this

Third Day of November, 1992

Attest:

DOUGLAS B. COMER

Attesting Officer

Acting Commissioner of Patents and Trademarks